US006921266B2

(12) United States Patent
Kon (10) Patent No.: US 6,921,266 B2
(45) Date of Patent: Jul. 26, 2005

(54) TRAINING-CURRICULUM CREATING SYSTEM, SERVER, METHOD AND COMPUTER PROGRAM FOR CREATING A TRAINING CURRICULUM

(75) Inventor: Tsutomu Kon, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 371 days.

(21) Appl. No.: 10/132,384

(22) Filed: Apr. 26, 2002

(65) Prior Publication Data

US 2002/0160349 A1 Oct. 31, 2002

(30) Foreign Application Priority Data

Apr. 27, 2001 (JP) .................................. 2001-130631

(51) Int. Cl.[7] ................................................ G09B 9/00
(52) U.S. Cl. ........................................ 434/219; 705/11
(58) Field of Search ............................ 434/307 R, 322, 434/323, 219, 350, 362, 365; 705/10–12

(56) References Cited

U.S. PATENT DOCUMENTS

| 5,326,270 | A | | 7/1994 | Ostby et al. |
| 6,119,097 | A | * | 9/2000 | Ibarra ........................... 705/11 |
| 6,126,448 | A | * | 10/2000 | Ho et al. ..................... 434/219 |
| 6,134,539 | A | | 10/2000 | O'Connor et al. |
| 6,157,808 | A | * | 12/2000 | Hollingsworth ............. 434/350 |
| 6,325,631 | B1 | * | 12/2001 | Kouba et al. ................ 434/219 |
| 6,556,974 | B1 | * | 4/2003 | D'Alessandro ............... 705/10 |
| 6,604,084 | B1 | * | 8/2003 | Powers et al. ................. 705/11 |
| 6,735,570 | B1 | * | 5/2004 | Lacy et al. ..................... 705/7 |
| 2002/0019765 | A1 | * | 2/2002 | Mann et al. ................... 705/11 |
| 2002/0077884 | A1 | * | 6/2002 | Sketch ......................... 705/12 |
| 2002/0137015 | A1 | * | 9/2002 | Guinta et al. ............... 434/323 |

FOREIGN PATENT DOCUMENTS

| WO | WO 99/32986 | 7/1999 |
| WO | WO 01/13296 | 2/2001 |

OTHER PUBLICATIONS

U.S. Appl. No. 60/200,559.*
U.S. Appl. No. 60/256,854.*

* cited by examiner

Primary Examiner—Xuan M. Thai
Assistant Examiner—Kathleen M. Christman
(74) Attorney, Agent, or Firm—Oblon, Spivak, McClelland, Maier & Neustadt, P.C.

(57) ABSTRACT

In a server, a data processor creates a question message in accordance with question-setting data, in order to study behavior characteristics of a sales staff in sales activities. The data processor evaluates the behavior characteristics of the sales staff in the sales activities, based on first answer data representing an answer of the sales staff and second answer data representing an answer of a boss of the sales staff. A curriculum creator automatically creates a training curriculum in accordance with a process result of the data processor.

5 Claims, 5 Drawing Sheets

| COMPANY NAME | EXECUTION DATE |
|---|---|
| SECTION NAME | SALES STAFF NAME |

A: YES  C: MAYBE NO

B: MAYBE YES  D: NO

| | | | | | |
|---|---|---|---|---|---|
| 1 | DOES CUSTOMER INFORMATION CONTAIN NOT ONLY YOUR COMPANY CUSTOMERS, BUT ALSO OTHER COMPANY CUSTOMERS? | A | B | C | D |
| 2 | ............................... ................ | A | B | C | D |
| 3 | ............................... ................ | A | B | C | D |

FIG.4

| A=1 | B=2 |
| C=3 | D=4 |

| COMPANY NAME | EXECUTION DATE |
| SECTION NAME | SALES STAFF NAME |

| SALES STEP | ACTIVITY | SUBJECT TO BE EVALUATED | EVALUATED POINTS | BEHAVIOR CHARACTERISTICS |
|---|---|---|---|---|
| PRELIMINARY STUDY | PRELIMINARY ANALYSIS | MANAGEMENT OF CUSTOMER INFORMATION | ○○ | CUSTOMER INFORMATION IS DISORDERLY MANAGED |
| | | FORMING LIST OF TARGET CUSTOMERS | ○○ | THERE IS NO CLEAR RULE FOR DETERMINING TARGET CUSTOMER |
| | | FORMING SALES STRATEGY | ○○ | TEHRE IS CLEAR BUSINESS SCHEDULE FOR BUSINESS ACTIVITIES TO BE DONE FOR LISTED CUSTOMERS |
| APPROACHING | ESTABLISHING CONNECTION | | | |
| | ESTABLISHING RELATION | | | |

TRAINING-CURRICULUM CREATING SYSTEM, SERVER, METHOD AND COMPUTER PROGRAM FOR CREATING A TRAINING CURRICULUM

BACKGROUND OF THE INVENTION

1. Field of the Invention

The present invention relates to a computer network system serving as a training-curriculum creating system.

2. Description of the Related Art

In organizations, such as corporations, etc., various kinds of training are done for the purpose of improving the ability of each member within the organizations. To improve the ability of the member, it is necessary to carry out training suitable for the circumstances, conditions or needs of the member. As a method of examining the circumstances of the member, a questionnaire written on a sheet of paper may be used. The member receives the questionnaire from a training leader, such as a trainer of a certain kind of training, and completes the received questionnaire. Thus completed questionnaire is collected by the training leader. The training leader checks the questionnaire collected from each member, and creates a training curriculum. According to this method, the training leader has so many things and tasks to do.

Each member to be trained and his/her boss may often have a different view on the circumstances of the member. In such a case, it is necessary to eliminate this difference.

SUMMARY OF THE INVENTION

The present invention has been made in consideration of the above. It is accordingly an object of the present invention to provide a training-curriculum creating system for efficiently creating a training curriculum.

In order to attain the above object, according to the first aspect of the present invention, there is provided a training-curriculum creating system comprising:

a first terminal which is used by at least one member of an organization;

a second terminal which is used by a boss of the at least one member;

a server including a sender which sends a question message to the first terminal and the second terminal, in order to provide the at least one member and the boss with a question table including at least one question regarding the at least one member, a receiver which receives first answer data and second answer data from the first terminal and the second terminals, respectively, a data processor which executes an evaluation process for evaluating a behavior characteristic of the at least one member, based on the first answer data and the second answer data received by the receiver, and a curriculum creator which automatically creates a training curriculum in accordance with a result of the evaluation process executed by the data processor; and a network which is connected to the first terminal, the second terminal and the server, and wherein the first answer data represents at least one answer of the at least one member to the at least one question, and the second answer data represents at least one answer of the boss to the at least one question.

According to this invention, the curriculum creator automatically creates a training curriculum in accordance with a process result of the data processor. As a result of this, the trainer who is in charge of the training can carry out effective training with high efficiency.

The training-curriculum creating system may further comprise a third terminal which is used by a trainer who is to be carrying out training for the at least one member, and connected to the network, and wherein the sender sends data corresponding to the result of the evaluation process done by the data processor and to the training curriculum created by the curriculum creator.

In this structure:

the data processor may compare the first answer data and the second answer data, and create, in a case where it is detected that there is a difference between the first answer and the second answer in the comparison, a detection message for informing the boss and the trainer that the difference has been detected; and the sender may send the detection message created by the data processor to the second terminal and the third terminal.

The data processor may create an instruction message for suggesting the boss of the at least one member that the boss should have a talk with the at least one member about the difference, in a case where the data processor creates the detection message; and the sender may send the instruction message created by the data processor to the second terminal.

The at least one question may correspond to at least one service stage which includes at least one of:

a first sales stage corresponding to at least one business activity to be done by the at least one member before making contact with a customer;

a second sales stage corresponding to at least one business activity for making contact with the customer;

a third sales stage corresponding to at least one business activity for obtaining information regarding the customer;

a fourth stage corresponding to at least one business activity for understanding problems and/or important matters in sales activities;

a fifth stage corresponding to at least one business activity for providing the customer with at least one product item to be sold;

a sixth stage corresponding to at least one business activity for providing the customer with detail explanation of the at least one product item to be sold;

a seventh stage corresponding to at least one business activity for accepting an order for the at least one product item to be sold from the customer; and an eighth stage corresponding to at least one business activity to be done after the order for the product item is accepted.

The first terminal may not show relationship between the result of the evaluation process and the question regarding the at least one member, to the at least one member.

The data processor may specify one of the first to eighth sales stages that the at least one member can not handle well, based on a result of the evaluation process; and the curriculum creator may create a training curriculum corresponding to the one sales stage which is specified by the data processor.

The data processor may create an opening message for suggesting to open a certain training course, in a case where a number of the at least one member with similar behavior characteristics is equal to or greater than a predetermined threshold value; and the sender may send the opening message created by the data processor to the third terminal.

In order to attain the above object, according to the second aspect of the present invention, there is provided a server comprising:

a sender which sends a question message, for providing at least one member of an organization and a boss of the at least one member with a question table including at least one question regarding the at least one member, to a first terminal which is used by the at least one member and a second terminal which is used by the boss;

a receiver which receives first answer data and second answer data which are sent from the first terminal and the second terminal, respectively;

a data processor which executes an evaluation process for evaluating a behavior characteristic of the at least one member, based on the first and second answer data which are received by the receiver; and a curriculum creator which automatically creates a training curriculum in accordance with a result of the evaluation process executed by the data processor, and wherein the first answer data represents at least one answer of the at least one member to the at least one question, and the second answer data represents at least one answer of the boss to the at least one.

The sender may send data corresponding to the result of the evaluation process and to the training curriculum created by the curriculum creator, to a third terminal which is used by a trainer who is to be carrying out training for the at least one member.

The data processor may compare the first answer data and the second answer data, and create, in a case where it is detected that there is a difference between the first answer data and the second answer data in the evaluation process, a detection message for informing the boss and the trainer that the difference has been detected and an instruction message for instructing the boss to have a talk with the at least one member about the difference.

In order to attain the above object, according to the third aspect of the present invention, there is provided a method of creating a training curriculum, comprising the steps of:

sending a question message, for providing a question table to at least one member of an organization and a boss of the at least one member, to a first terminal which is used by the at least one member and a second terminal which is used by the boss;

receiving first answer data and second answer data from the first terminal and the second terminal, respectively;

evaluating a behavior characteristic of the at least one member, based on the first and second answer data; and automatically creating a training curriculum in accordance with a result of the evaluating step.

The method may further comprise the step of sending data corresponding to the result of the evaluating step and the created training curriculum, to a third terminal which is used by a trainer who is to be carrying out training for the at least one member.

The method may further comprise the steps of:

comparing the first answer data and the second answer data;

creating, in a case where it is detected that there is a difference between the at least one member and the boss as a result of the comparing step, a detection message for informing the boss and the trainer that the difference has been detected and an instruction message for instructing the boss to have a talk with the at least one member about the difference;

sending the detection message to the second terminal and the third terminal; and sending the instruction message to the second terminal.

In order to attain the above object, according to the fourth aspect of the present invention, there is provided a computer program which is executed by a server computer and includes instruction codes for respectively:

sending a question message, for providing a question table to at least one member of an organization and a boss of the at least one member, to a first terminal which is used by the at least one member and a second terminal which is used by the boss;

receiving first answer data and second answer data from the first terminal and the second terminal, respectively;

evaluating a behavior characteristic of the at least one member, based on the first and second answer data; and automatically creating a training curriculum in accordance with a result of evaluating the behavior characteristic of the at least one member.

The computer program may further include an instruction code for sending data corresponding to the result of evaluating the behavior characteristic of the at least one member and the created training curriculum, to a third terminal which is used by a trainer who is to be carrying out training for the at least one member.

The computer program may further include instruction codes for respectively:

comparing the first answer data and the second answer data;

creating, in a case where it is detected that there is a difference between the at least one member and the boss as a result of comparing the first answer data and the second answer data, a detection message for informing the boss and the trainer that the difference has been detected and an instruction message for instructing the boss to have a talk with the at least one member about the difference;

sending the detection message to the second terminal and the third terminal; and sending the instruction message to the second terminal.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENT

A training-curriculum creating system according to an embodiment of the present invention will now be described with reference to the accompanying drawings. This training-curriculum creating system is realized by a plurality of computers which are connected with each other through a network. In this embodiment, a server 10 studies the behavior characteristics of particular sales staffs to be executing sales tasks as members of an organization. Note, however, that the members of the organization are not limited to sales staffs.

The server 10 automatically forms a training curriculum that the sale staffs will take, based on a result of the study. The training curriculum formed by the server 10 is provided to a trainer of who is in charge of the training.

Figure 1:
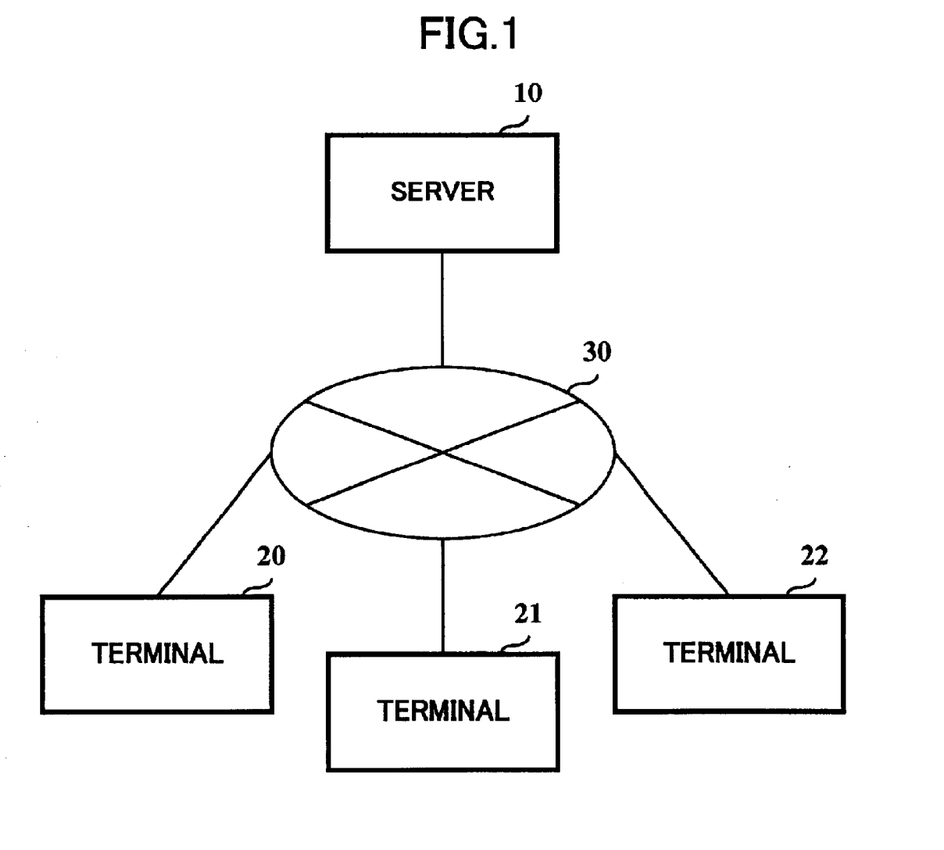
FIG. 1 is a diagram showing a training-curriculum creating system according to an embodiment of the present invention.

FIG. 1 shows the training-curriculum creating system according to the embodiment of the present invention. As shown in FIG. 1, the training-curriculum creating system of this embodiment comprises the server 10, terminals 20, 21 and 22, and a network 30.

The server 10 is a computer system including a CPU (Central Processing Unit), a ROM (Read Only Memory), a RAM (Random Access memory), an HDD (Hard Disk Drive), a network interface, and the like.

Figure 2:
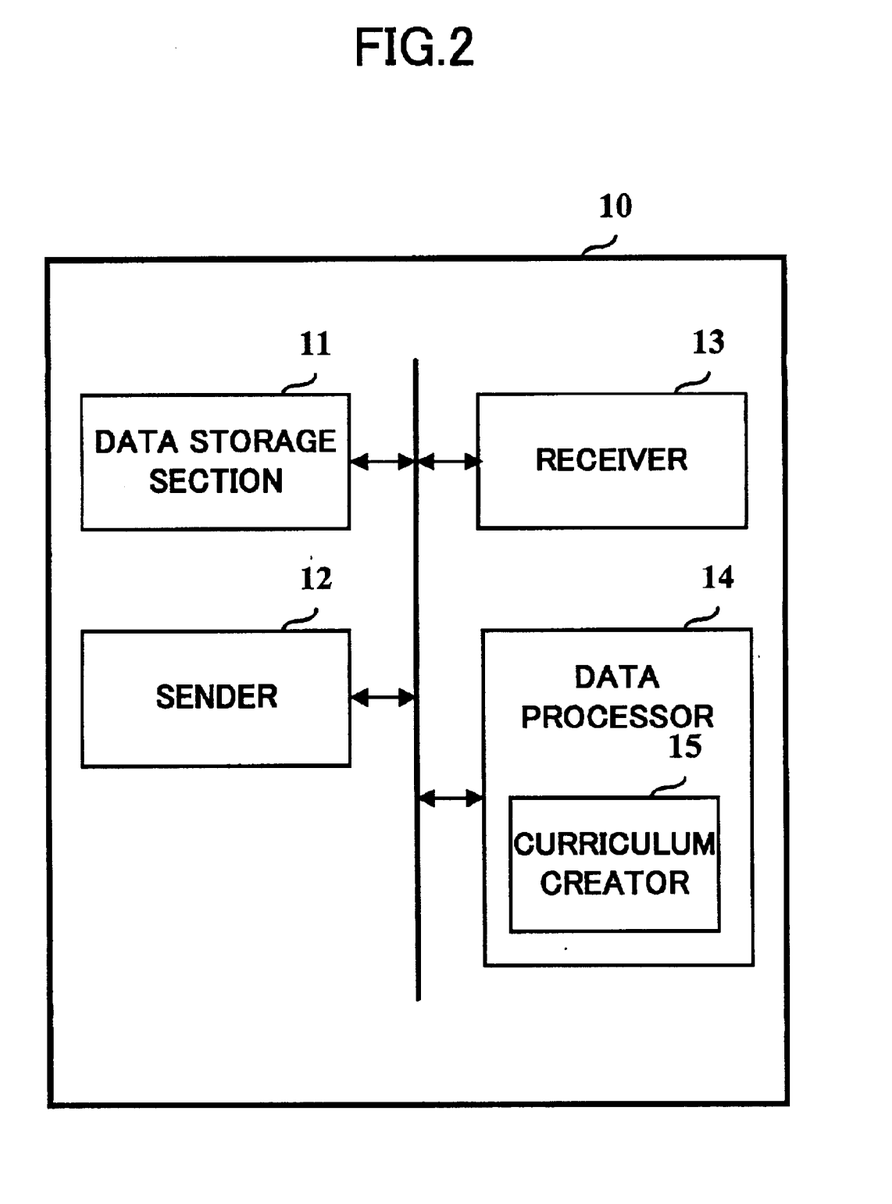
FIG. 2 is a diagram showing the structure of a server shown in FIG. 1.

FIG. 2 is a diagram showing the structure of the server 10. The server 10 includes a data storage section 11, a sender 12, a receiver 13 and a data processor 14. For example, the CPU of the server 10 executes a program stored in the HDD of the server 10, thereby realizing and controlling the structure of the server 10.

The data storage section 11 stores various data for forming a training curriculum. For example, the data storage section 11 stores question-setting data, which can be used for studying the behavior characteristics of a sales staff who is to take the training. In addition, the data storage section 11 may store first and second answer data, as will be explained later, which are received respectively from the terminals 20 and 21.

To send various messages created by the server 10, the sender 12 performs data communications with the terminals 20 to 22 through the network 30.

To receive various data, the receiver 13 performs data communications with the terminals 20 to 22 through the network 30.

The data processor 14 processes various data regarding the creation of the training curriculum.

To ask the sales staff and his/her boss some question(s) regarding the behavior characteristics of the sales staff, the data processor 14 creates a question message(s) to be sent from the server 10 to the terminals 20 and 21, in accordance with question-setting data stored in the data storage section 11. In addition, the data processor 14 evaluates the behavior characteristics of the sales staff in his/her sales tasks, based on the first and second answer data received by the receiver 13 from the respective terminals 20 and 21. The data processor 14 includes a curriculum creator 15 for automatically forming a training curriculum, based on a result of the evaluation regarding the behavior characteristics of the sales staff.

Each of the terminals 20 to 22 shown in FIG. 1 is a portable information processor or a desktop computer, comprising a CPU, a ROM, a RAM, an HDD, a display device, a keyboard, etc. The terminal 20 is used by the sales staff who is to be taking a training curriculum, while the terminal 21 is used by his/her boss, and the terminal 22 is used by a trainer of the training curriculum, as a training leader to be carrying out the training curriculum. The terminal 20 may be replaced with a plurality of terminals corresponding to a plurality of sales staffs to be trained.

The network 30 shown in FIG. 1 includes a communications line, such as a LAN, a WAN, the Internet etc., and a network unit, such as a router, a bridge, a repeater, etc.

Operations of the training curriculum creating system according to the embodiment of the present invention will now be explained.

In the server 10, the data processor 14 creates a question message in accordance with the question-setting data stored in the data storage section 11, in order to examine the behavior characteristics of a sales staff in the sales tasks. The sender 12 sends the created question message to the terminals 20 and 21 through the network 30. In this case, the sender 12 may send the question message, in response to a request for the created question message from either one or both of the terminals 20 and 21.

Figure 3:
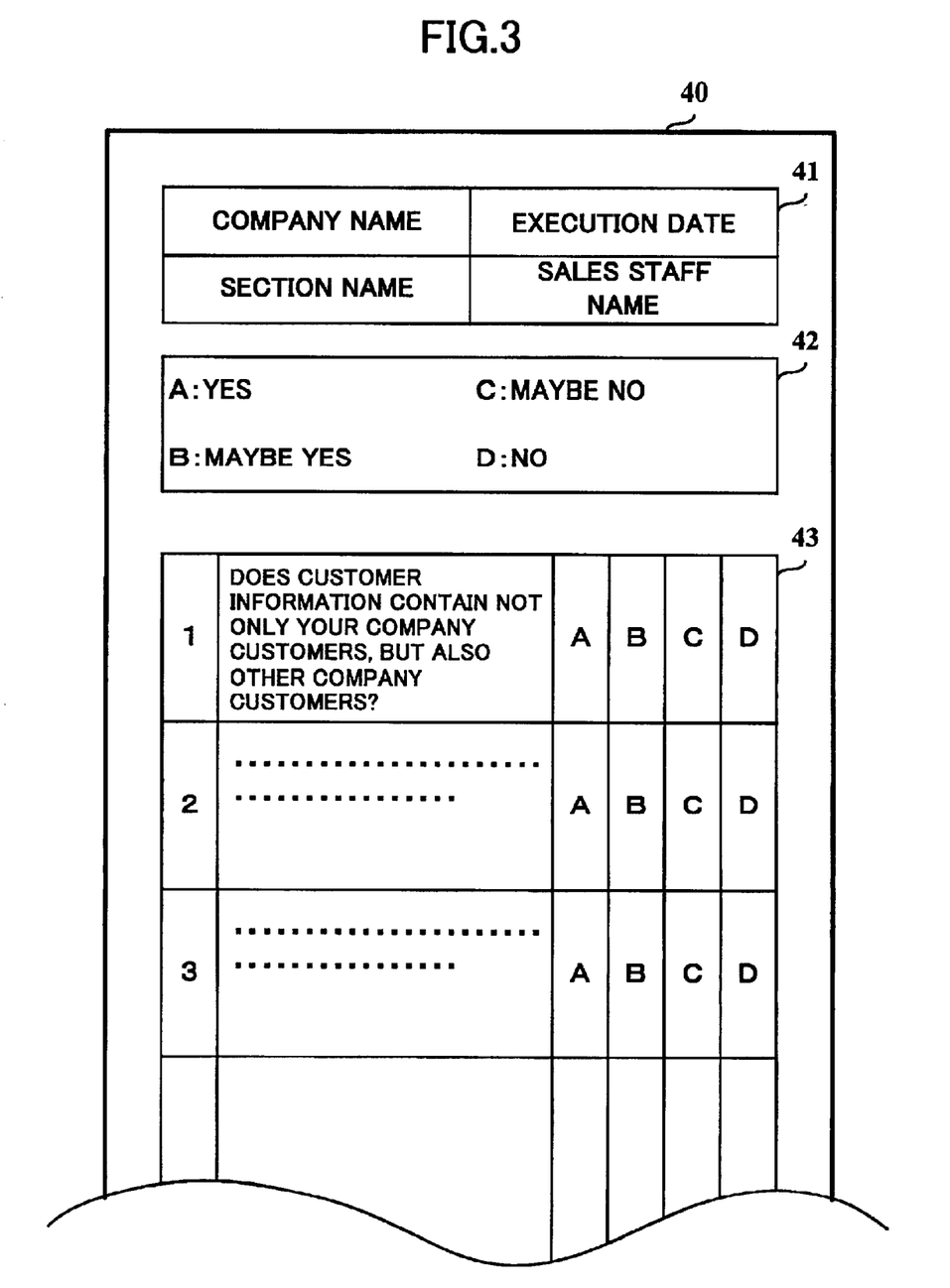
FIG. 3 is a diagram showing an example of a questionnaire table.

The terminals 20 and 21 execute a process corresponding to the question message sent from the server 10. As a result of this process, a questionnaire table 40 is displayed on the terminals 20 and 21, as shown in FIG. 3. The questionnaire table 40 shown in FIG. 3 includes three fields 41 to 43.

The field 41 is so set as to display information representing attributes of the sales staff to be trained. For example, the field 41 shows some data items of "company name", "section name", "execution date", and "sales staff name". The data item "company name" represents the company name of the sales staff to be trained. The data item "section name" represents the section that the sales staff to be trained belongs to. The data item "execution date" represents the date of completing the questionnaire. The data item "sales staff name" represents the name of the sales staff.

The field 42 shows what each of alphabetical symbols expresses, as choices one of which is to be selected as an answer to each corresponding question. As described in the questionnaire table 40 of FIG. 3, the symbol "A" represents "Yes", the symbol "B" represents "Maybe Yes", the symbol "C" represents "Maybe No", and the symbol "D" represents "No".

The field 43 shows a plurality of questions for examining the behavior characteristics of the sales staff, and is set to input answers to the respective questions. For example, there is displayed a question "Does customer information contain not only your company customers, but also other company customers?", as a question to the sales staff and his/her boss in the field 43. Those questions to be displayed in the field 43 can arbitrarily be set in accordance with the conditions (e.g. the type of business of the company, the type of the training, etc.) of the case for adapting the training curriculum creating system of this embodiment.

In the questionnaire table 40, the relationship between the evaluation of the stales staff and each of the questions is not given to the sales staff.

The sales staff operates the terminal 20 to give an answer to each of the questions shown in the field 43 based on his/her behavior characteristics. The terminal 20 creates the first answer data representing the answer contents of the sales staff. The first answer data created by the terminal 20 is sent to the server 10 through the network 30.

The boss of the sales staff operates the terminal 21 to give an answer to each of the questions shown in the field 43 based on the behavior characteristics of the sales staff. In accordance with operations of the boss, the terminal 21 creates the second answer data representing the answer contents of the boss. The second answer data created by the terminal 21 is sent to the server 10 through the network 30.

In the server 10, the receiver 13 receives the first answer data sent from the terminal 20 and the second answer data sent from the terminal 21. The receiver 13 supplies the data processor 14 with the first and second answer data.

The data processor 14 executes various processes using the first and second answer data.

In one process to be executed by the data processor 14, the data processor 14 compares the first answer data and the second answer data. As a result of the comparison, the data processor 14 detects the difference between each answer of the sales staff to each question and the corresponding answer of his/her boss to the same question. If there is detected a different between the answer of the sales staff and the answer of his/her boss, the data processor creates a "detection message" for informing the boss and the trainer about the detected difference. The sender 12 sends the "detection message" created by the data processor 14 to the terminals 22 and 23 through the network 23. In addition, upon creation of the "detection message", the data processor 14 creates an instruction message for suggesting the boss that he/she should discuss about the detected difference with the sale staff. The sender 12 sends the instruction message created by the data processor 14 to the terminal 21 through the network 30.

The terminals 21 and 22 execute a process corresponding to the detection message sent from the server 10. As a result of this process, information for informing the boss and the trainer about the detection of the difference is output onto the terminals 21 and 22.

Further, the terminal 21 executes a process corresponding to the instruction message sent from the server 10. As a result of this process, information for informing the boss that he/she should discuss about the difference with the sales staff is output onto the terminal 21.

The boss of the sales staff operates the terminal 21 to input information regarding what the boss discussed with the sales staff. In accordance with the operations of the boss, the terminal 21 creates conclusion data representing the discussion contents. The conclusion data created by the terminal 21 is sent to the terminal 22 through an e-mail, for example. Based on the discussion contents which is output upon execution of a process corresponding to the conclusion data, the trainer adjusts the training contents or talks with the boss about the training.

Figure 4:
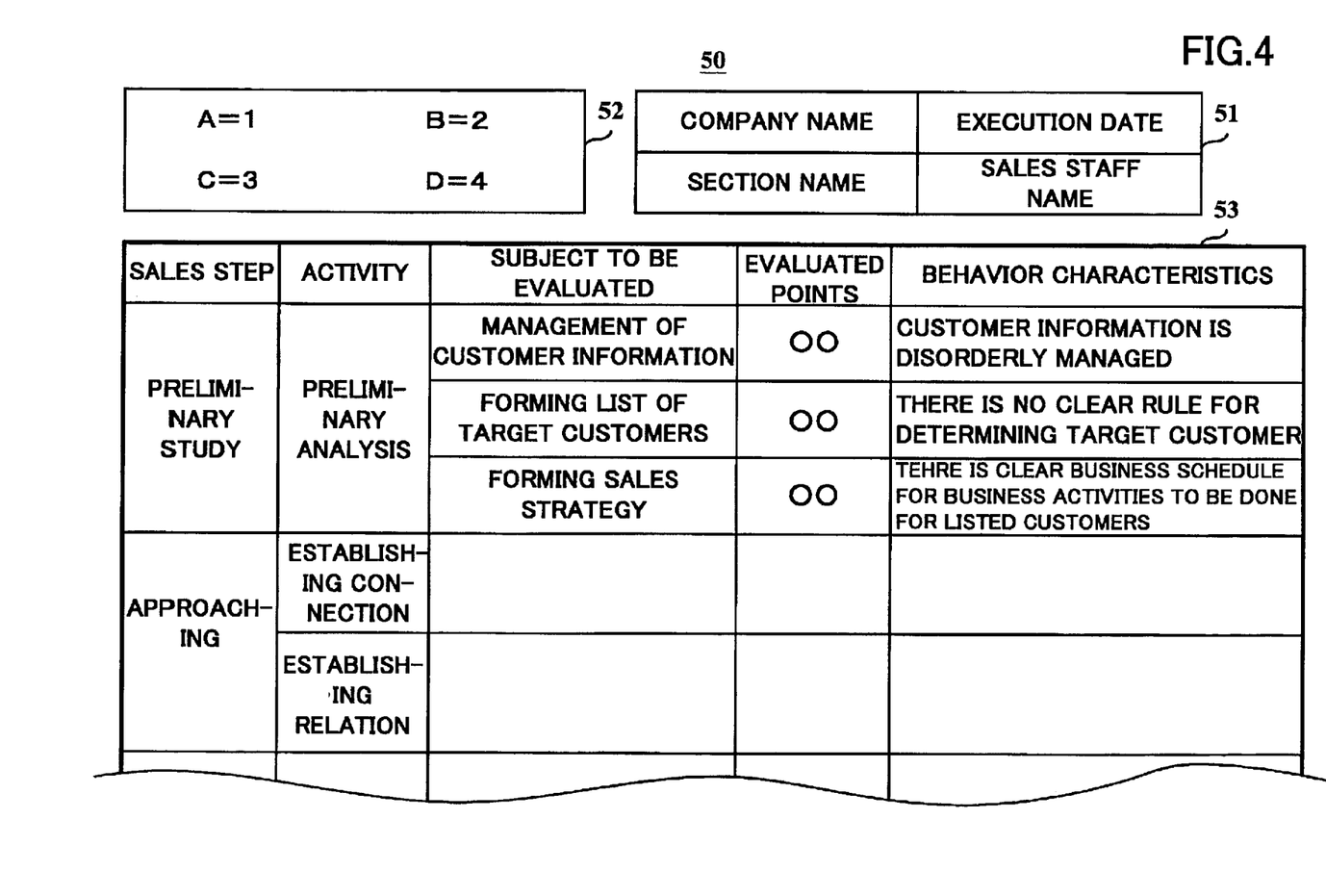
FIG. 4 is a diagram showing the structure of a behavior evaluation table.

In one process executed by the data processor 14, the data processor 14 creates data groups corresponding to a behavior evaluation table 50 shown in FIG. 4, using the first and second answer data sent respectively from the terminals 20 and 21.

The behavior evaluation table 50 shown in FIG. 4 has three fields 51 to 53.

The field 51 is a data sheet representing an attribute of the sale staff to be trained. For example, the field 51 includes data items of "company name", "section name", "execution date", and "sales staff name".

The field 52 is a data sheet representing evaluation values corresponding to the symbols which are input as the answers to the questions on the terminals 20 and 21. For example, data included in the field 52 shows that the evaluation values of the symbols "A", "B", "C" and "D" are "1", "2", "3" and "4", respectively.

The field 53 is a data sheet representing the evaluation on the behavior characteristics of the sales staff. The field 53 includes data columns of "sales step", "activity", "subject to be evaluated", "evaluated points", and "behavior characteristics".

The data column of "sales step" shown in the field 53 includes several data items corresponding to, for example, eight progress levels of the sales activities done by the sales staff. In this case, the column of "sales step" includes eight data items, i.e. the eight sales steps, in association with the eight progress levels.

The first sales step is a "preliminary study" step corresponding to at least one business activity which can be done before the sales staff make contact with a customer. The second sales step is an "approaching" step corresponding to at least business activity for making contact with the customer. The third sales step is an "information collection" step corresponding to at least one business activity for acquiring various information regarding the customer. The fourth sales step is a "sharing" step corresponding to at least one business activity for understanding problems and/or important matters in sales activities. The fifth sales step is a "presentation" step corresponding to at least one business activity for suggesting a target product item to the customer. The sixth sales step is a "demonstration" step corresponding to at least one business activity for providing the customer with the detail explanation of the product. The seventh sales step is an "ordering" step corresponding to at least one business activity for accepting an order for the sales product from the customer. The eighth sales step is an "after-care" step corresponding to at least one business activity which is done after the order for the sales product is accepted.

The data column of "activity" shown in field 53 includes several business activities in association with each data item of "sales step". For example, the first sales step "preliminary study" of the data column of "sales step" in the field 53 corresponds to a data item of "preliminary analysis" as a business activity. The second sale step "approaching" of the data column of "sales step" in the field 53 corresponds to data items of "establishing connection with target customer" and"establishing relation with target customer".

The data column of "subject to be evaluated" in the field 53 represents at least one subject to be evaluated, in association with each data item of "activity". For example, the data item of "preliminary analysis" in the column of "activity" in the field 53 corresponds to three data items of "management of customer information", "making list of target customers", and "forming sales strategy".

The data item of "evaluated points" shown in the field 53 indicates an evaluated point of each "subject to be evaluated". The data processor 14 adds the first answer data and the second answer data, every time it specifies the evaluated value of each subject to be evaluated. For example, the data items of "evaluated points" correspond to the data items of "subject to be evaluated", respectively. Each of the data items of "evaluated points" indicates the sum of the first answer data and the second answer data and a bar graph of the sum.

The data items of "behavior characteristics" shown in field 53 includes text data regarding the behavior characteristics of the sales staff, in association with each "subject to be evaluated".

In the table 50 shown in FIG. 4, text data of "customer information is disorderly managed" is retained as a data item of "behavior characteristics", in association with the data item of "management of customer information". In the table 50, text data of "there is no clear rule for determining a target customer" is retained as another data item of "behavior characteristics", in association with the data item of "making list of target customers" in the data column of "subject to be evaluated". Further, in this table 50, text data of "there is a clear business schedule for business activities to be done for listed customers" is retained as a data item of "behavior characteristics", in association with the data item of "forming sales strategy".

The data processor 14 analyzes the behavior characteristics of the sales staff, based on the information of the above-described behavior evaluation table 50. For example, the data processor 14 sums up the points shown in the column of "evaluated points" included in the behavior evaluation table 50, and creates an evaluated points of the behavior characteristics. The data processor 14 specifies one of the sales steps that the sales staff does not like or can not handle well, based on the result of the analysis. The analyzed result of the data processor 14 is sent to the curriculum creator 15.

The curriculum creator 15 automatically creates a training curriculum for overcoming the sales step that the sales staff does not like or can not handle well, based on the analyzed result of the data processor 14.

The sender 12 sends data which corresponds both to the behavior evaluation table 50 and to the training curriculum created by the curriculum creator 15, to the terminal 22 through the network 30. The terminal 22 outputs information for providing the behavior characteristics of the sales staff and the training curriculum to the trainer, in accordance with the data sent from the server 10. When the number of sales staffs with similar behavior characteristics reaches or exceeds a predetermined threshold value, the data processor 14 may create an "opening message" for suggesting to open a certain training course for the sales staffs with the similar behavior characteristics. The sender 12 sends the "opening message" created by the data processor 14 to the terminal 22 through the network 30. The terminal 22 executes a process corresponding to the "opening message" received from the server 10. As a result of this process, information for suggesting the trainer to open the training course is output onto the terminal 22. In this manner, the trainer can carry out an effective training with an adequate number of people.

According to the above embodiment of the present invention, the server 10 sends the questionnaire table 40 to the sales staff to be trained and his/her boss, through the network 30. The server 10 automatically creates a training curriculum, based on the first answer data and the second answer data sent respectively from the terminals 20 and 21. The training curriculum formed by the server 10 is provided to the trainer through the network 30. The trainer can carry out an effective training, in accordance with the training curriculum created by the server 10.

Figure 5:
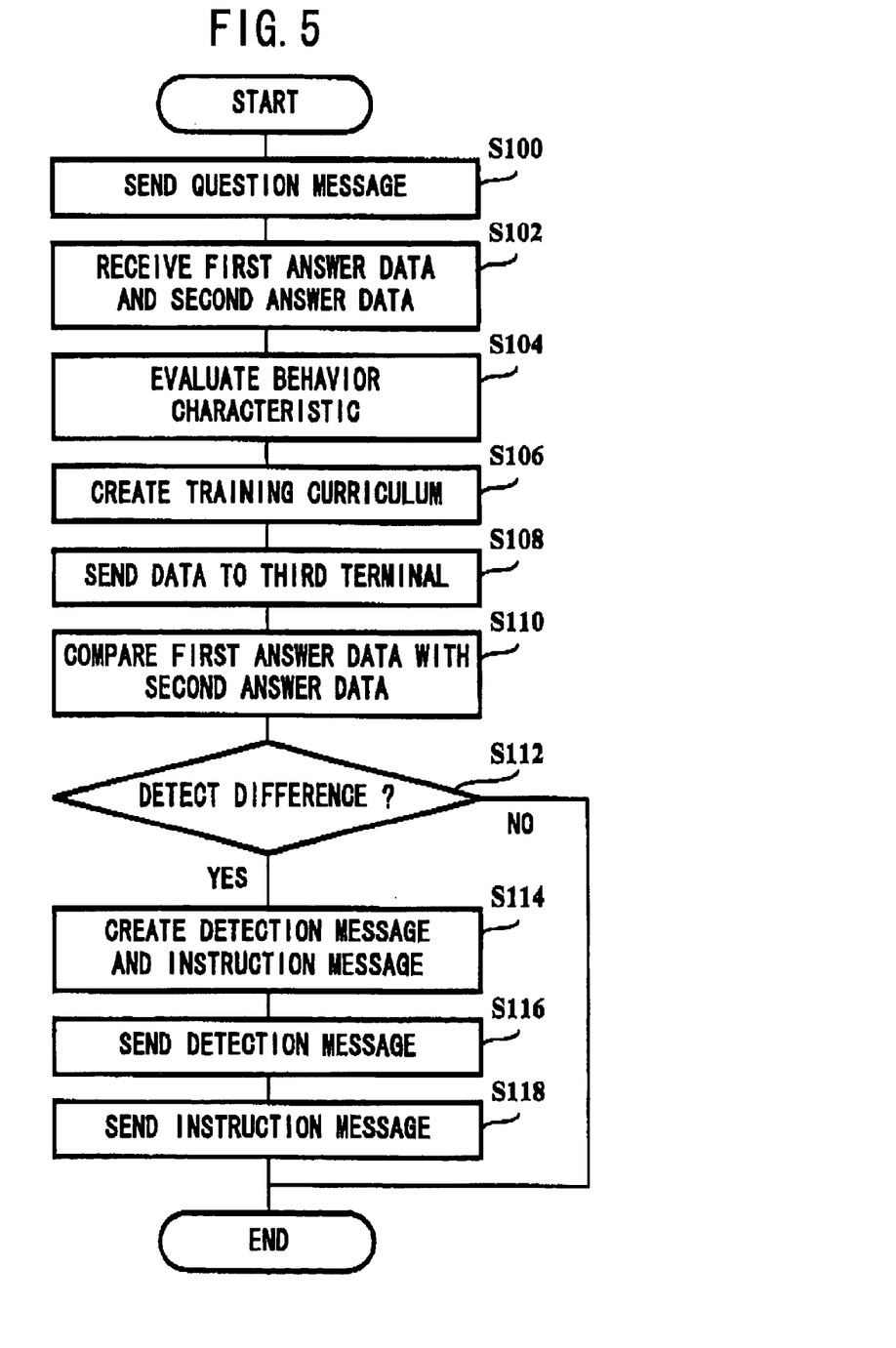
FIG. 5 is a flow diagram showing an example of a training curriculum creating method according to an embodiment of the present invention.

FIG. 5 is a flow diagram showing an example of a training curriculum creating method according to an embodiment of the present invention. In step S100 a question message is sent. In step S102, first and second answer data are received. In step S104, behavior characteristics are evaluated. In step S106, a training curriculum is created. In step S108, data is sent to a third terminal. In step S110, first answer data is compared to second answer data. In step S112, as a result of the comparison a difference is detected. If there is no difference between each answer, the method ends. However, if there is a difference between the first answer data and the second answer data, the method continues with step S114, in which detection and instruction messages are created. In step S116 the detection message is sent, and in step S118 the instruction message is sent.

The system of the present invention can be realized by a general computer, without the need for a dedicated system. A program and data for controlling a computer to execute the above-described operations may be recorded on a medium (a floppy disk, CD-ROM, DVD or the like) and distributed, and the program may be installed into the computer and run on an OS (Operating System) to execute the above-described processes, thereby achieving the system of the present invention. The above program and data may be stored in a disk device or the like in the server device on the Internet, and embedded in a carrier wave. The program and data embedded in the carrier wave may be downloaded into the computer so as to realize the system of the present invention.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-130631 filed on Apr. 27, 2001, and including specification, claims, drawings and summary. The disclosure of the above Japanese Patent Application is incorporated herein by reference in its entirety.

What is claimed is:

1. A training-curriculum creating system comprising:
   a first terminal which is used by at least one member of an organization;
   a second terminal which is used by a boss of the at least one member;
   a third terminal which is used by a trainer who is to be carrying out training for the at least one member;
   a server including
      a sender which sends a question message to said first terminal and said second terminal in order to provide said at least one member and said boss with a question table including at least one question regarding the at least one member,
      a receiver which receives first answer data and second answer data from said first terminal and said second terminal, respectively,
      a data processor which executes an evaluation process for evaluating a behavior characteristic of the at least one member based on the first answer data and the second answer data received by said receiver, and
      a curriculum creator which automatically creates a training curriculum in accordance with a result of the evaluation process executed by said data processor; and
   a network which is connected to said first terminal, said second terminal, said third terminal and said server,
   wherein the first answer data represents at least one answer of the at least one member to the at least one question,
   the second answer data represents at least one answer of the boss to the at least one question,
   said sender sends data corresponding to the result of the evaluation process done by said data processor and to the training curriculum created by said curriculum creator, to said second terminal,
   said data processor compares the first answer data and the second answer data, and creates, in a case where it is detected that there is a difference between the first answer and the second answer in the comparison, a detection message for informing the boss and the trainer that the difference has been detected, and
   said sender sends the detection message created by said data processor to said second terminal and said third terminal.

2. The training-curriculum creating system according to claim 1, wherein:
   said data processor creates an instruction message for suggesting the boss of the at least one member that the boss should have a talk with the at least one member about the difference, in a case where said data processor creates the detection message; and said sender sends the instruction message created by said data processor to said second terminal.

3. A server comprising:

a sender which sends a question message, for providing at least one member of an organization and a boss of the at least one member with a question table including at least one question regarding the at least one member, to a first terminal which is used by the at least one member and a second terminal which is used by the boss;

a receiver which receives first answer data and second answer data which are sent from said first terminal and said second terminal respectively;

a data processor which executes an evaluation process for evaluating behavior characteristic of the at least one member based on the first and second answer data which are received by said receiver; and a curriculum creator which automatically creates a training curriculum in accordance with a result of the evaluation process executed by said data processor, wherein the first answer data represents at least one answer of the at least one member to-the at least one question, the second answer data represents at least one answer of the boss to the at least one question, said sender sends data corresponding to the result of the evaluation process and to the training curriculum created by said curriculum creator, to a third terminal which is used by a trainer who is to be carrying out training for the at least one member, and said data processor compares the first answer data and the second answer data, and creates, in a case where it is detected that there is a difference between the first answer data and the second answer data in the evaluation process, a detection message for informing the boss and the trainer that the difference has been detected and an instruction message for instructing the boss to have a tally with the at least one member about the difference.

4. A method of creating a training curriculum, comprising:

sending a question message, for providing a question table to at least one member of an organization and a boss of the at least one member, to a first terminal which is used by the at least one member and a second terminal which is used by the boss;

receiving first answer data and second answer data from said first terminal and said second terminal, respectively;

evaluating a behavior characteristic of the at least one member based on the first and second answer data;

automatically creating a training curriculum in accordance with a result of said evaluating;

sending data corresponding to the result of the evaluating and the created training curriculum, to a third terminal which is used by a trainer who is to be carrying out training for the at least one member;

comparing the first answer data and the second answer data;

creating, in a case where it is detected that there is a difference between the at least one member and the boss as a result of the comparing step, a detection message for informing the boss and the trainer that the difference has been detected and an instruction message for instructing the boss to have a talk with the at least one member about the difference;

sending the detection message to said second terminal and said third terminal; and sending the instruction message to said second terminal.

5. A computer program embedded on a computer-readable medium and executed by a server computer, the computer program comprising instruction codes for respectively;

sending a question message, for providing a question table to at least one member of an organization and a boss of the at least one member, to a first terminal which is used by the at least one member and a second terminal which is used by the boss;

receiving first answer data and second answer data from said first terminal and said second terminal, respectively;

evaluating a behavior characteristic of the at least one member, based on the first and second answer data:

automatically creating a training curriculum in accordance with a result of evaluating the behavior characteristic of the at least one member;

comparing the first answer data and the second answer data;

creating, in a case where it is detected that there is a difference between the at least one member and the boss as a result of comparing the first answer data and the second answer data, a detection message for informing the boss and the trainer that the difference has been detected and an instruction message for instructing the boss to have a talk with the at least one member about the difference;

sending the detection message to said second terminal and said third terminal; and sending the instruction message to said second terminal.

* * * * *